Figure 9:
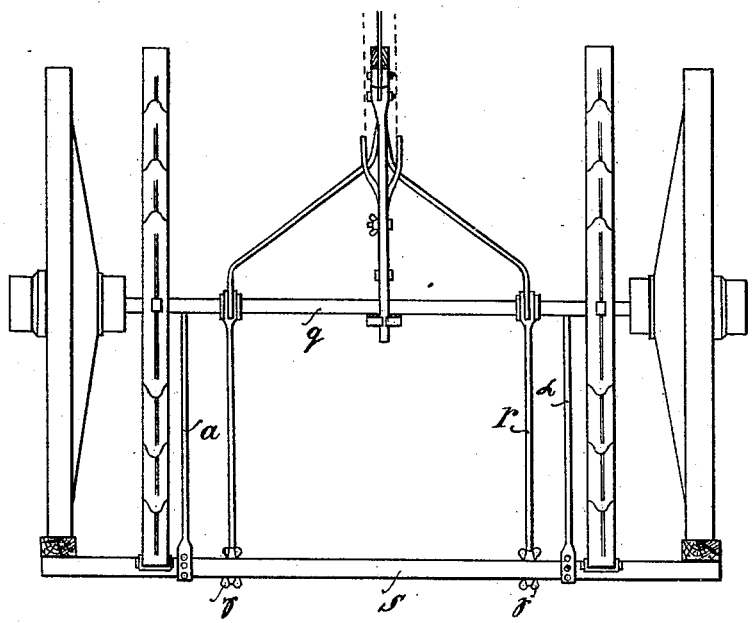

(No Model.) 9 Sheets—Sheet 1.
C. WENING.
AUTOMATIC BRAKE FOR VEHICLES.
No. 422,475. Patented Mar. 4, 1890.
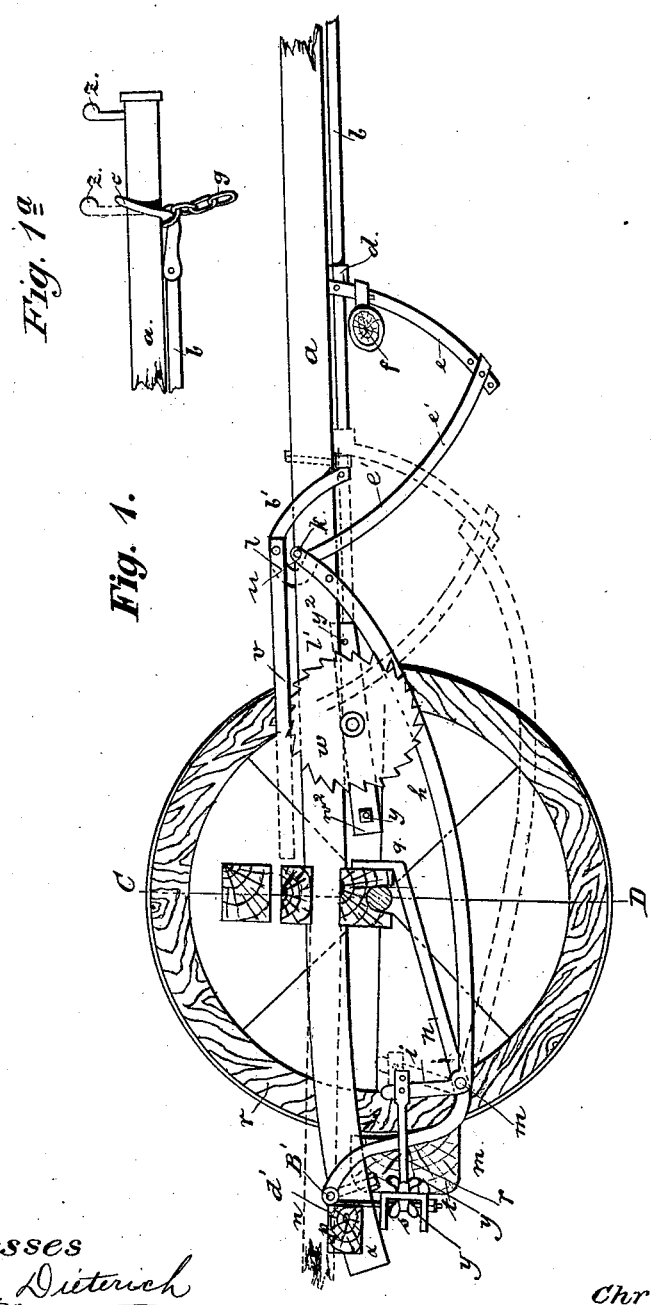

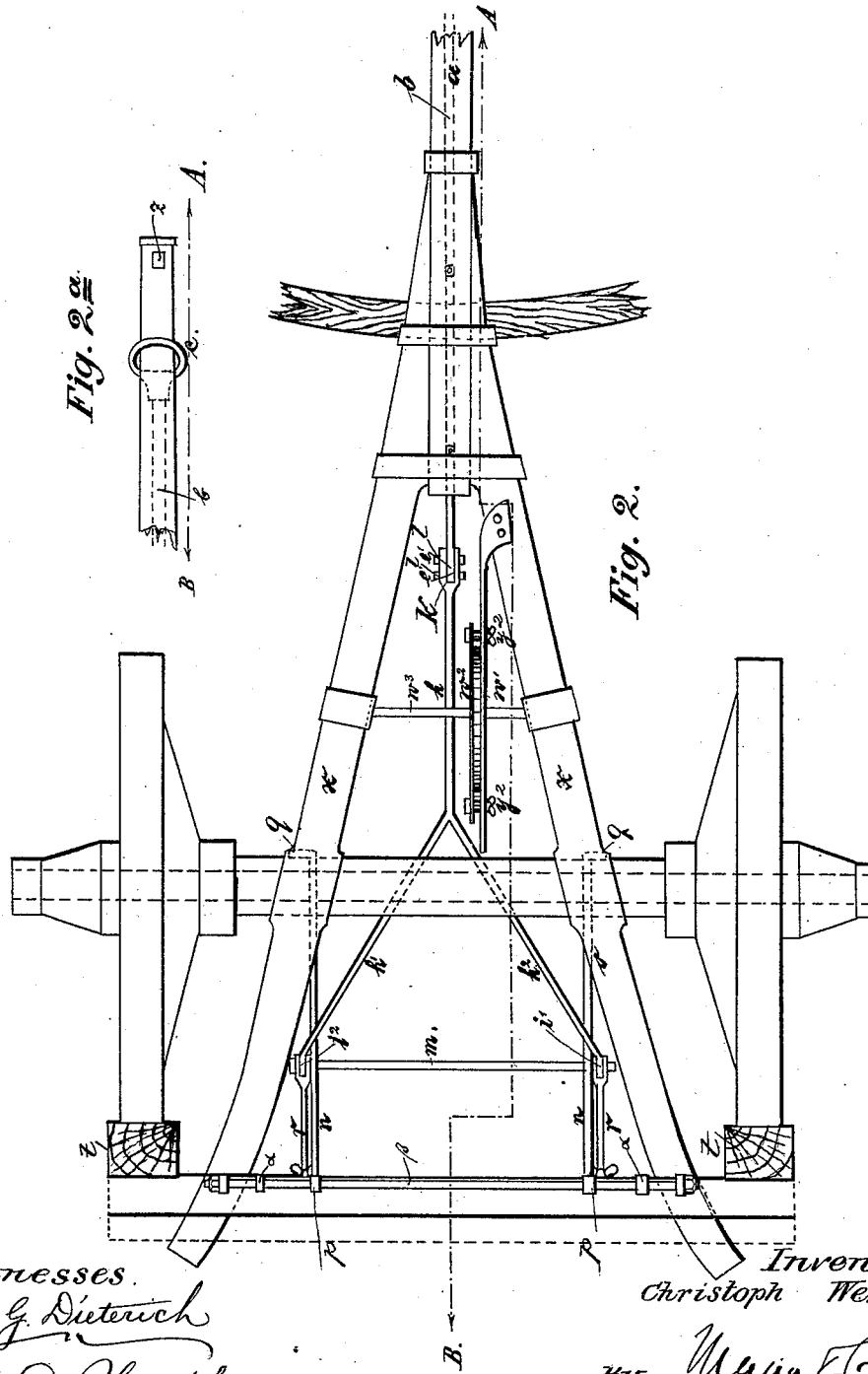

(No Model.) 9 Sheets—Sheet 3.
C. WENING.
AUTOMATIC BRAKE FOR VEHICLES.
No. 422,475. Patented Mar. 4, 1890.
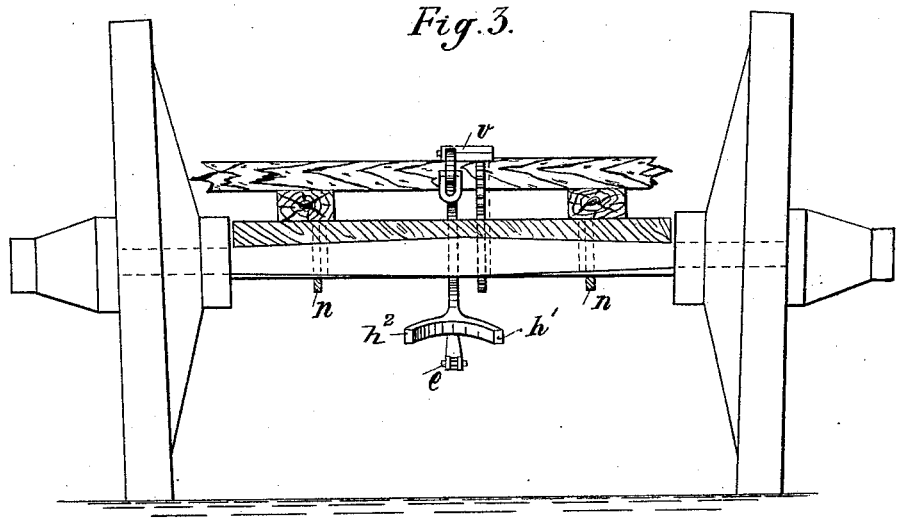
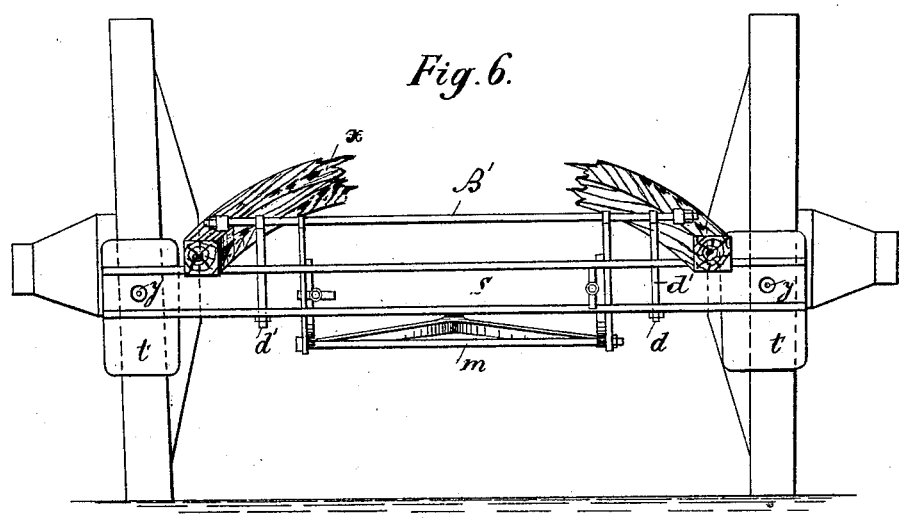

(No Model.) 9 Sheets—Sheet 4.
C. WENING.
AUTOMATIC BRAKE FOR VEHICLES.
No. 422,475. Patented Mar. 4, 1890.
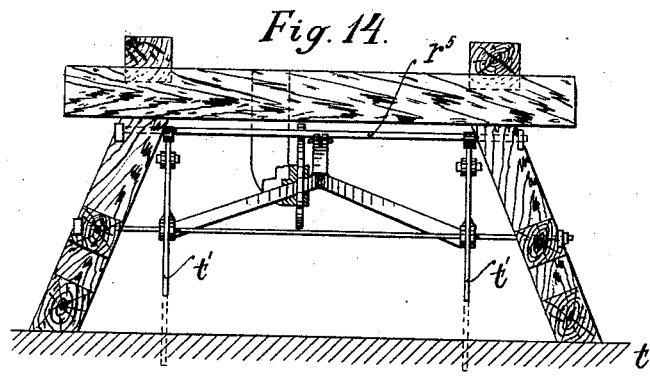
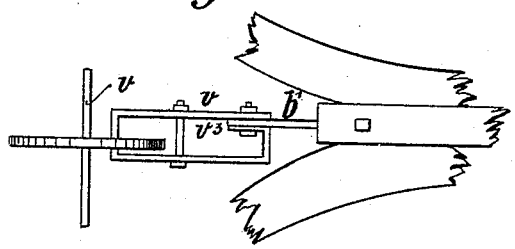
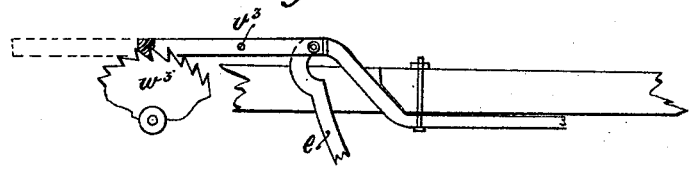
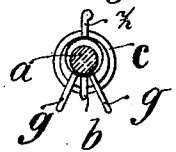
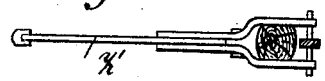
Witnesses.
Fred G. Dieterich
M. Blondel
Inventor
Christoph Wening
By [signature]
Attorneys (No Model.) 9 Sheets—Sheet 5.
C. WENING.
AUTOMATIC BRAKE FOR VEHICLES.
No. 422,475. Patented Mar. 4, 1890.
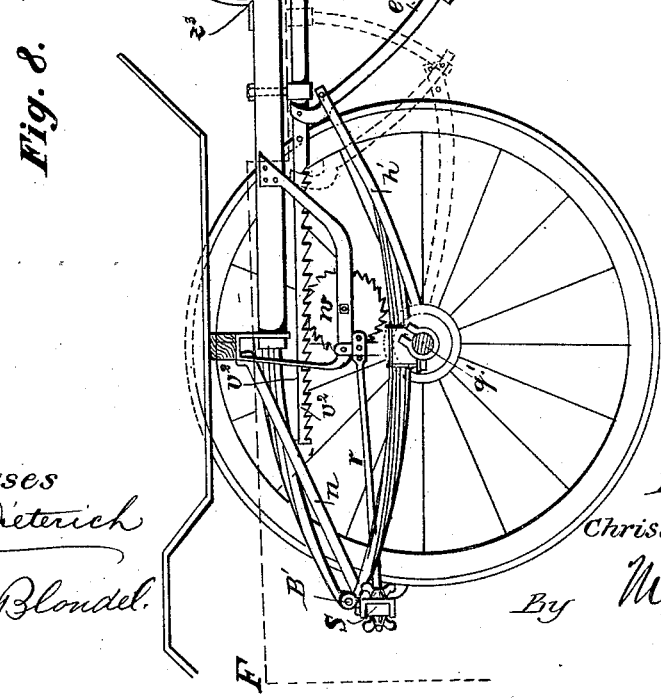
Witnesses
Fred G. Dieterich
M. D. Blondel
Inventor
Christoph Wening
By Munn & Co.
Attorneys (No Model.) 9 Sheets—Sheet 6.
C. WENING.
AUTOMATIC BRAKE FOR VEHICLES.
No. 422,475. Patented Mar. 4, 1890.

Witnesses
Fred G. Dieterich
M. D. Blondel

Inventor
Christoph Wening
By Munn &Co
Attorneys (No Model.) 9 Sheets—Sheet 7.
C. WENING.
AUTOMATIC BRAKE FOR VEHICLES.

No. 422,475. Patented Mar. 4, 1890.

Witnesses
Fred G. Dieterich
M. D. Blondel

Inventor
Christoph Wening
By Munn & Co
Attorneys.

(No Model.) 9 Sheets—Sheet 8.
C. WENING.
AUTOMATIC BRAKE FOR VEHICLES.
No. 422,475. Patented Mar. 4, 1890.

Witnesses
Fred G. Dieterich
M. D. Blondel

Inventor
Christoph Wening
By Munn & Co.
Attorneys

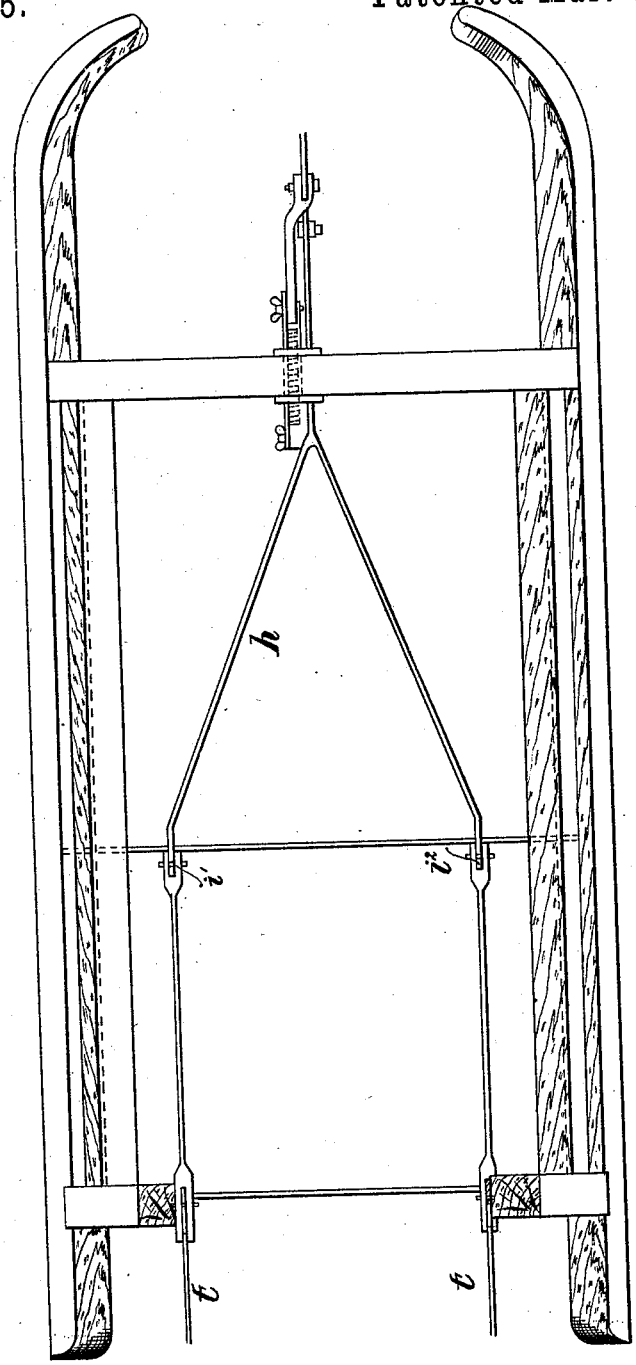

UNITED STATES PATENT OFFICE.

CHRISTOPH WENING, OF NEUENDETTELSAU, BAVARIA, GERMANY.

AUTOMATIC BRAKE FOR VEHICLES.

SPECIFICATION forming part of Letters Patent No. 422,475, dated March 4, 1890.

Application filed April 24, 1889. Serial No. 308,497. (No model.)

*To all whom it may concern:*

Be it known that I, CHRISTOPH WENING, of Neuendettelsau, in the Kingdom of Bavaria and German Empire, have invented a new and useful Automatic Brake for Carts, Carriages, and other Vehicles, of which the following is a specification, reference being had therein to the accompanying drawings.

This invention relates to an automatic brake which can be applied to carts and other load-carrying vehicles, and to carriages, sledges, and other conveyances, the object being to provide a brake which upon a rising gradient or approximately level ground is normally held out of action, but automatically applied whenever in going downhill there is a tendency for the vehicle to travel faster than the animal or animals by which it is drawn. This end is effected by means of a draw-rod secured to the shafts or pole and moving in a longitudinal direction, the said rod, as a backward pressure is exerted thereon by the draft animal or animals, serving to apply the brake-blocks to the tires of the wheels with greater or less pressure, according to the extent of the declivity upon which the vehicle may under such circumstances be traveling.

The present invention differs chiefly from the brake apparatus heretofore employed on account of a varying pressure being automatically applied to the brake-blocks, which pressure is greatest on the steepest hill, and is only entirely removed when an approximately level surface is being driven over. The brake-blocks are, moreover, gradually applied and gradually withdrawn by the automatic mechanism, instead of being, comparatively speaking, suddenly put on and suddenly taken off by hand. In addition, means are provided whereby the brake apparatus may be thrown out of action while the cart or other vehicle is being backed.

Figure 10:
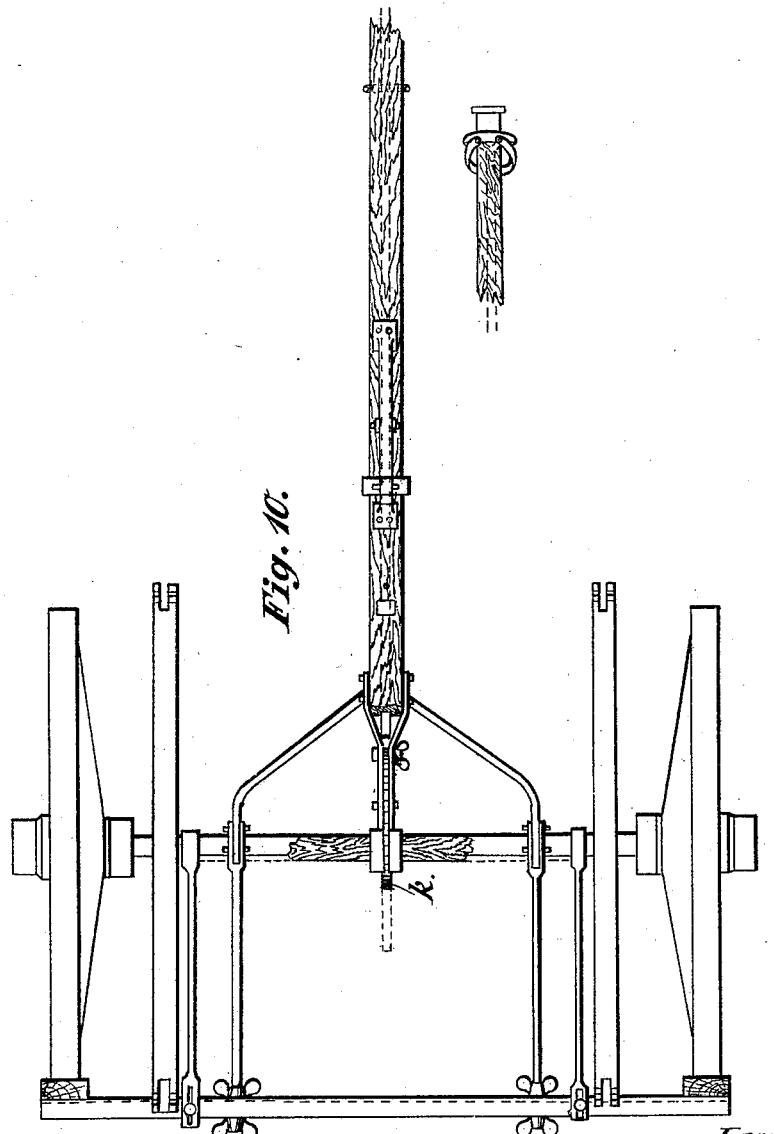
Figure 15:
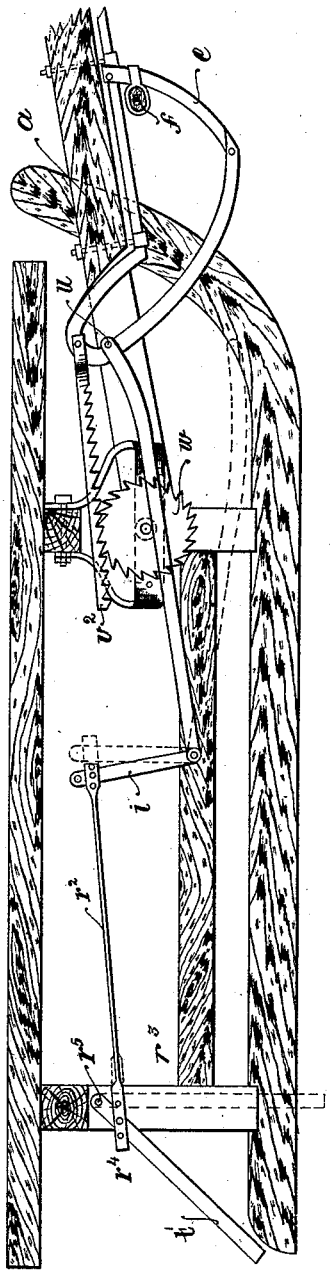

Figure 1 is a side view in longitudinal section on the line A B, Fig. 2, of a cart with the invention applied. Fig. 2 is a plan view thereof. Fig. 1ᵃ is a side view, and Fig. 2ᵃ is a plan view, of the outer end of the pole broken away. Fig. 3 is a cross-section on the line C D, Fig. 1. Fig. 4 is a plan view with parts broken away, and Fig. 5 a side view, partly in section and broken away, of a portion of the mechanism for automatically and slowly releasing the brake-blocks. Fig. 6 is a rear view of the cart with parts broken away, showing a portion of the brake apparatus. Fig. 7 is a view of the front end of the shaft or pole with the sliding rod and stop-ring. Fig. 8 is a side view, partly in section and broken away, showing the invention applied to a gig. Fig. 9 is a plan view, with parts removed, of the device in Fig. 8. Fig. 10 is a plan view, with parts removed, of the device in Fig. 8. Fig. 11 is a view of the front end of the shaft with the sliding rod, drawn on an enlarged scale. Fig. 12 is a front view in elevation of a detail of the operating mechanism. Fig. 13 is a side view in longitudinal section of a sled with the invention applied. Fig. 14 is a transverse section, and Fig. 15 is a plan view in horizontal section, of the device in Fig. 13.

The mode of carrying out this invention when applied to carts, as in Figs. 1 to 7, differs from that shown in Figs. 8 to 12 for gigs or private carriages, in so far that in the former the pivot of the crank-lever operated by the sliding rod is arranged outside the axis of the wheel, while in the latter the said pivot is placed upon the axis aforesaid.

In Figs. 1 to 7 the shaft $a$ of the cart carries on its under side the draw-rod $b$, which may be made either of metal or wood. The forward extremity of the said rod terminates in a ring $c$, called the "stop-ring," which surrounds the shaft $a$, the rod $b$ being moved to and fro along the shaft within guides $d\ d$. To the rear end of the sliding rod $b$ is attached a curved bar $e$, to which is fixed the yoke-bar $f$. Each draft animal is yoked on one side by a chain $g$ to the front end of the sliding rod $b$ and on the other side by means of traces attached to the yoke-bar $f$ aforesaid. The sliding rod $b$ is connected to a bent and bifurcated lever $h$ in such a manner that the forked end $k$ of the said lever embraces the curved bar $e'$. Through the end $k$ two pins $l\ l'$ are inserted, one on each side of the bar $e'$. The rear end of the lever $h$ is divided into two arms $h'\ h^2$, jointed to a rod $m$, carried by means of angle-pieces $n\ o$, which are respectively connected to the shaft at $p$ and to the axle at $q$. The arms $h'$ and $h^2$ terminate in two upright limbs $i'$ and $i^2$. The latter are connected to the brake-shaft $s$ by means of two connecting-rods $r\ r$, the brake-blocks $t\ t$ being fixed to the extremities of the said shaft. The brake-shaft is pivoted to the rod B', Fig. 6, by means of the two rods $d'$ and $d'$. The thumb-screws $y$ serve to adjust the brake-blocks as wear takes place.

In Fig. 1 the brake apparatus is shown out of action, the dotted lines indicating the position the parts assume when the brake-blocks are applied to the wheels of the vehicle. In the withdrawn or normal position the brake is held out of action by reason of the pin $l$ engaging with a notch $u$ in the upper end of the curved bar $e'$. At the end $b'$, Fig. 4, of the sliding rod $b$ is arranged a pawl $v$, which is bent into a rectangular shape, and at its rear end slides over the upper teeth of a ratchet-wheel $w$, when the sliding rod $b$ is pushed back. The ratchet-wheel $w$ is fixed between the bars $w'\ w^2$ to the shaft $a$, the bar $w^2$ being pressed more or less against the ratchet-wheel $w$ by the thumb-screws $y^2\ y^2$. The ratchet-wheel is supported on an axis $w^3$. As the screws $y\ y$ are more or less tightly screwed, whereby the bars $w'\ w^2$ are correspondingly pressed against the ratchet-wheel, a proportionate resistance is opposed to the motion of the said wheel, owing to the friction set up between the latter and the bars $w'\ w^2$. When the cart is traveling downhill, a backward pressure is exerted by the draft animals through the chains $g$ to the rod $b$, so that the said rod, together with the curved bar $e$, may be moved into the position shown in dotted lines in Fig. 1. During this movement the pin $l$ leaves the notch $u$ in the upper end of the bar $e$ and the end $k$ of the lever $h$ moves downward along the said bar. The limbs $i'\ i^2$ are hereby moved forward, in consequence of which the brake-shaft is caused to partially rotate, whereby the brake-blocks are pressed against the wheel-tires. With the draw-rod $b$ the pawl $v$ is also caused to move rearward, so that the part $v'$ may slide over the teeth of the ratchet-wheel $w$, Fig. 4, while the brake-blocks $t\ t$ are being applied. As the movement of the ratchet-wheel is restricted, owing to its being gripped between the bars $w'\ w^2$, the sliding rod $b$, and consequently the lever $h$, is held by means of the pawl $v$ in the depressed position as long as necessary for relieving the draft-animals from undue strain. When the inclination of the road diminishes so that the cart ceases to roll any further under the influence of gravity alone, the draft-animals then commence to draw again as the result of the small force exerted at first by them, the sliding rod $b$ is moved forward far enough to so turn the ratchet-wheel that the lever $h$ is raised to a slight extent, and the brake is partly taken off. When the draft-animals exert enough force in the forward direction to draw the vehicle along a level road, the ratchet-wheel is caused to rotate far enough backward to enable the pawl $v$ and draw-rod $b$ to return to their normal position. The lever $h$ is then so raised that the pin $l$ engages once more in the notch $u$ in the end of the bar $e$, whereupon the brake is entirely taken off. The brake is not immediately withdrawn, but only gradually, according to the extent to which the inclination of the road varies.

By regulating the proportions of the ratchet-wheel $w$ and of the screws $y$ the frictional resistance between the two can be considerably increased or decreased, and the brake can thus be adapted for light or heavy vehicles.

In order to be able to apply or withdraw the brakes by hand, a lever may be arranged upon the pawl $v$, by means of which the latter can be disengaged from the ratchet-wheel $w$. To enable the backing of the vehicle to take place without the brake being applied, a pin $z$ is arranged on the front end of the shaft $a$, which pin may be inserted in the shaft behind the ring $c$ on the draw-rod $b$, when such backing is contemplated, so that the said rod may be prevented from moving, while under such circumstances backward pressure is exerted thereon by the draft-animals. When the vehicle is being drawn in a forward direction, the pin $z$ is moved so that the ring $c$ may be able to slide freely upon the front end of the shaft $a$.

The brake mechanism illustrated in Figs. 8 to 12 is intended for use with the lighter class of vehicles. In this modification the lever $h$ is jointed, by means of its arms $h'\ h^2$, directly to the axis $q$ of the gig, the ends of the said lever being coupled, by means of connecting-rods $r'$, to the brake-shaft $s$. The rear end of the sliding rod $b$ carries a rack $v^2$, which gears with the ratchet-wheel $w$. The latter, as before, is fixed between two adjustable bars $w'\ w^2$. When a hill is being descended, the rack $v^2$ slides over the teeth of the ratchet-wheel $w$ as the sliding rod $b$ is being pushed back. When the draft-animals again commence to draw, the rack $v^2$ and sliding rod $b$ are moved slightly forward, the brakes being correspondingly loosened. To enable the ratchet arrangement to be disconnected when the vehicle is being backed, a lever $z'$ is provided, which is pivoted at $z^2$ to the shaft $a$, and carries on its lower arm a bolt $z^3$, which engages behind the pin $z^4$ on the sliding rod $b$ when the lever $z'$ is turned from the position indicated in dotted lines to that shown in the illustration. Under such circumstances the sliding rod cannot move backward, but bears, through the pin $z^4$, against the bolt $z^3$, so that the carriage can be backed without the brake being put on.

The method of applying this invention to a sledge will be readily understood on reference being made to Figs. 13, 14, and 15 of the accompanying drawings without further description being necessary.

What I claim, and desire to secure by Letters Patent of the United States, is—

1. A vehicle-brake consisting of a draw-rod mounted on a vehicle-pole and having an attachment at its forward end and a yoke-bar adjacent to its rear end, to which a team is to be connected, a frame on the rear end of the draw-rod having a pawl, a ratchet-wheel with rearwardly-cut teeth adapted to engage the pawl, brake-shoes mounted on a vibrating frame, and a crank-lever mechanism connected at one end to the brake-shoes and at the other by means of a sliding joint with the frame on the end of the draw-rod, substantially as described.

2. A vehicle-brake consisting of a draw-rod mounted on a vehicle-pole and having a stop-ring at its forward end movable on the pole, a yoke-bar adjacent to its rear end and having a rearwardly-curved depending bar, a forwardly-curved depending bar connected at its lower end to the rearwardly-curved depending bar, connected at its upper end to the draw-rod and having a notch or recess adjacent thereto, a pawl connected to the upper portion of the forwardly-curved depending bar, a ratchet-wheel with rearwardly-cut teeth engaging the pawl, a forked lever having its forward end loosely engaging the forwardly-curved depending bar and movable thereon, and angular rear ends, brake-locks mounted on a vibrating frame, and rods connecting the brake-blocks with the angular ends of the forked lever, substantially as described.

3. A vehicle-brake consisting of the draw-rod $b$, having a sliding ring $c$ at its forward end, the rearwardly-curved depending bar $e$, with yoke-bar $f$ adjacent to the rear end of the rod $b$, the forwardly-curved depending bar $e'$, connected at its lower end to the lower end of bar $e$ and formed with the notch $u$ at its upper end, and the depending arm $b'$, connected to rod $b$, the pawl $v$, connected to the rear end of rod $b$, the ratchet-wheel $w$, with rearwardly-cut teeth clamped between bars $w'$ $w^2$ by means of thumb-screws $y^2$, the forked lever $h$, having arms $h'$ $h^2$, and forked forward end $k$, engaging-bar $e'$, with pins $l$ $l'$ on either side thereof, and vertical angular ends $i$ $i^2$, the brake-blocks $t$, mounted on shaft $s$, connected by rods $d'$ with shaft $B'$, and the rods $r$, connecting the shaft $s$ with arms $i'$ $i^2$, substantially as shown and described.

In witness whereof I have hereunto set my hand in presence of two witnesses.

CHRISTOPH WENING.

Witnesses:
 WM. ESSEMWEIN,
 P. WEISENFELD.